United States Patent

[11] 3,633,945

| [72] | Inventors | Irving D. Press<br>West Orange;<br>Henry E. Heigis, Nutley, both of N.J. |
|---|---|---|
| [21] | Appl. No. | 972 |
| [22] | Filed | Jan. 6, 1970 |
| [45] | Patented | Jan. 11, 1972 |
| [73] | Assignee | Resistoflex Corporation<br>Roseland, N.J. |

[54] HIGH-PRESSURE CHEMICALLY RESISTANT BELLOWS
6 Claims, 7 Drawing Figs.

| [52] | U.S. Cl. | 285/226 |
|---|---|---|
| [51] | Int. Cl. | F16l 51/02 |
| [50] | Field of Search | 285/226, 227, 228, 229, 299, 300, 301, 114, 367; 138/121, 122 |

[56] References Cited

UNITED STATES PATENTS

| 1,835,298 | 12/1931 | Greene | 285/301 |
|---|---|---|---|
| 2,481,472 | 9/1949 | Culp | 285/226 X |
| 3,016,249 | 1/1962 | Contreras et al. | 285/367 X |
| 3,028,290 | 4/1962 | Roberts et al. | 138/121 X |
| 3,076,737 | 2/1963 | Roberts | 138/121 X |

FOREIGN PATENTS

| 934,912 | 1/1948 | France | 138/121 |
|---|---|---|---|

Primary Examiner—Thomas F. Callaghan
Attorney—Robert M. Freeman

ABSTRACT: A bellows formed from polytetrafluoroethylene resin is reinforced by providing substantially nonexpandable channel-shaped rings surrounding each of the crests of the corrugated tube closely fitting the maximum outside diameter of the corresponding crest at least when the pipe connection is in its original unstrained condition. The rings are preferably adjustable in girth but may be fixed in the diameter.

INVENTORS
IRVING D. PRESS
HENRY E. HEIGIS
BY Ward McEllannon Brooks Fitzpatrick
ATTORNEYS

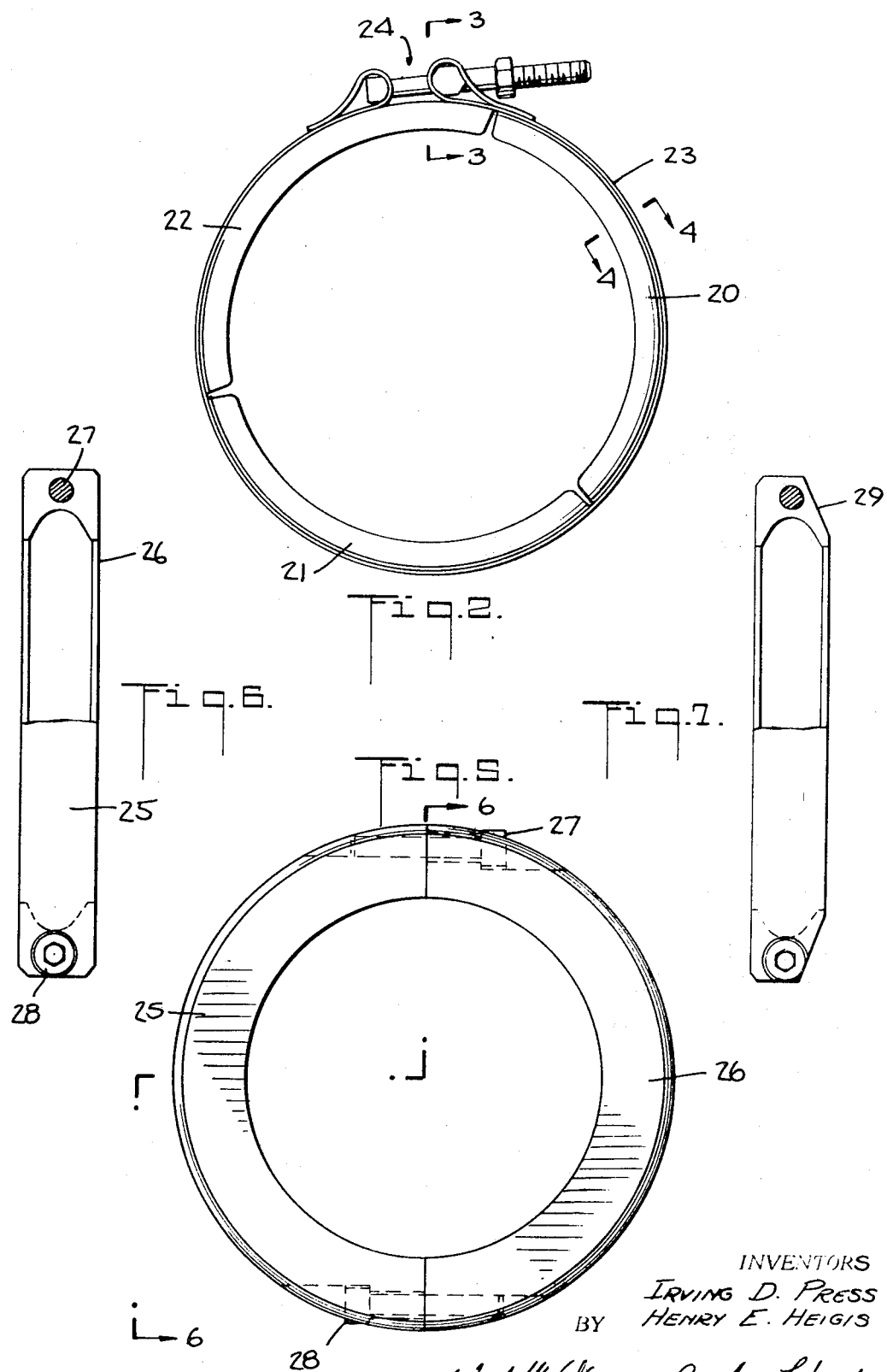

HIGH-PRESSURE CHEMICALLY RESISTANT BELLOWS

The present invention relates to a flexible pipe connection and, more particularly, to one comprising an annularly corrugated tube of nonmetallic material.

Corrugated or bellows-type pipe connections are required as flexible couplings, expansion joints, and the like, in an infinite variety of plumbing applications. Where corrosion resistance such as in the chemical-processing industry is required, it has been found necessary to resort to materials such as polytetrafluoroethylene (P.T.F.E.) resin for construction of the joints in question. One limitation, however, on flexible joints presently available with walls of P.T.F.E. resin is the maximum pressure-handling capability. It is, therefore, a purpose of the present invention to substantially increase the pressure-handling capability of a corrugated tube of nonmetallic material. Specifically, it has been found that the invention to be described hereinafter results in more than a twofold improvement in the burst strength of the bellows structure to which it is applied.

In accordance with the invention there is provided a flexible pipe connection comprising an annularly corrugated tube of nonmetallic material, and a substantially nonexpandable channel-shaped ring surrounding each of the crests of the corrugated tube closely fitting the maximum outside diameter of the corresponding crest at least when the pipe connection is in its original unstrained condition.

The invention will be better understood after reading the following detailed description of the presently preferred embodiments thereof with reference to the appended drawings in which:

FIG. 2 is a plan view of a reinforcing ring of the form employed in the structure of FIG. 1;

FIG. 5 is a plan view of a modified ring usable in the assembly of FIG. 1;

FIG. 6 is a sectional view taken along the line 6—6 of FIG. 5; and

FIG. 7 is a view similar to FIG. 6 showing a modification in the configuration thereof.

Throughout the drawings the same reference numerals are used to designate the same or similar parts.

Figure 1:
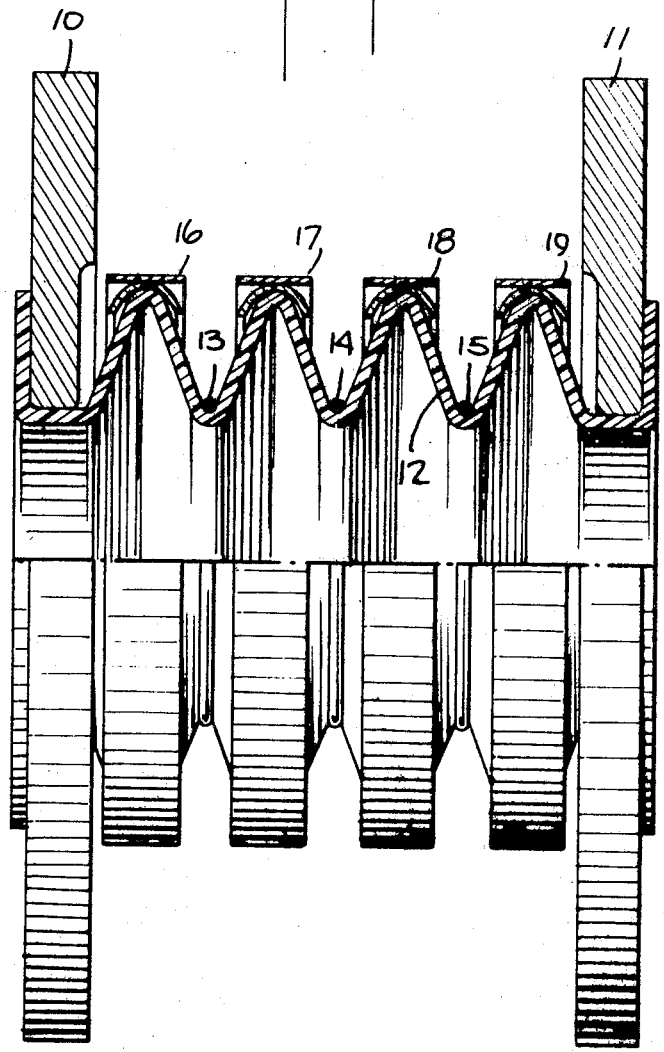
FIG. 1 is an elevational view in quarter section showing a bellows constructed in accordance with the present invention.

Referring now to FIG. 1, there is shown by way of example a bellows having: a pair of end-connecting flanges 10 and 11; a corrugated tube 12 of nonmetallic material; a plurality of substantially nonexpandable continuous rings 13, 14, and 15 disposed in each of the valleys of the corrugated tube 12; and a plurality of channel-shaped rings 16, 17, 18, and 19 surrounding each of the crests of the tube 12. The tube 12 may be formed from sintered P.T.F.E. resin by the process described in U.S. Pat. No. 2,983,961 issued May 16, 1961, entitled "Blow Molding of Polytetrafluoroethylene." Alternatively, it may be formed by any other suitable method. It should be understood that if the method of the aforesaid patent is employed, the rings 13, 14, and 15 must be installed in the mold prior to blowing of the basic tube stock. Generally, presently known methods for forming the corrugated tube in conjunction with the rings 13, 14, and 15 result in some looseness or play between the rings and the minimum diameter of the corresponding valleys.

Figure 3:
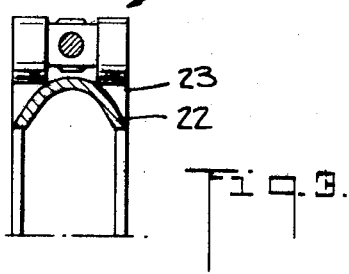
FIG. 3 is a fragmentary section taken along the line 3—3 of FIG. 2.
Figure 4:
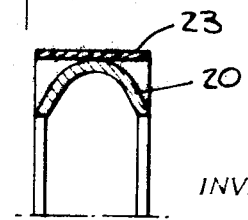
FIG. 4 is a fragmentary section taken along the line 4—4 of FIG. 2.

Tee construction of the channel-shaped rings 16, 17, 18, and 19, which are all identical, may best be seen in FIGS. 2, 3, and 4. As seen therein, the channel-shaped ring comprises a plurality of U-shaped sheet metal channel members, here three, designated by the numerals 20, 21, and 22, in continuous end-to-end abutting relationship joined by spot welding or other suitable means to the inner surface of a band clamp formed from a metallic strap 23 joined together by an adjustable "T-bolt" assembly 24. It will be appreciated that the structure in FIG. 2 provides an adjustable girth ring with a radially inwardly directed channel. These rings are applied over the individual crests of the corrugations in the bellows structure and tightened to make a relatively snug fit therewith. It will be observed from FIG. 1 that in the original unstrained condition of the bellows the legs of the channel in the individual rings 16, 17, 18, and 19 diverge slightly from the sidewalls of the individual corrugations. The rings are tightened just until they closely fit the maximum outside diameter of the corresponding crest. The advantage of making the rings adjustable is that the outside diameters of the individual crests may vary slightly from one to the next due to the nature of the forming technique for the bellows.

With a reinforcing ring of the type shown in FIGS. 1 through 4, the width of the strap 23 is preferably no greater than the width of the channel members 20, 21, and 22. Otherwise the rings will interfere with one another upon bending or compression of the bellows structure.

Assuming that the crests of the various corrugations can be held to suitable close tolerances in manufacture, nonadjustable rings may be employed for embracing same. In FIGS. 5 and 6 there is illustrated a modified ring comprising a pair of identical half rings machined from solid stock. The initial blanks may be provided by casting, for example. As seen in FIG. 5, the halves 25 and 26 are provided with means for holding them together as clearly shown at 27 and 28.

When the rings of the type shown in FIGS. 5 and 6 are employed it may be necessary to modify those used nearest the connecting flanges in order to avoid interference with the flange when the bellows is compressed longitudinally. As shown in FIG. 7, one side 29 of the ring may be sloped in order to afford such clearance. Alternatively, the recess in the inside face of the flange can be altered to accommodate the ring in FIG. 5.

As mentioned above, the sidewalls of the rings diverge radially inwardly providing initial clearance between them and the adjacent flanks of the underlying corrugations when the pipe connection is in its original unstrained condition. This clearance will diminish somewhat as the pipe connection is pressurized or extended longitudinally. The clearance will also be altered as the bellows is subjected to either lateral or angular deflection.

It is important that the reinforcing rings over the crests of the bellows make initially a snug fit therewith. It has been found that if the initial fit is loose there is a decrease in pressure-handling capability of the resultant structure. It is also interesting to note that when a bellows constructed from P.T.F.E. in accordance with the teachings of the present invention is subjected to elevated temperature and internal fluid pressure some small clearance will develop between the crests of the corrugations and the surrounding ring upon depressurizing and cooling. However, this clearance will exist only when the bellows is free from internal pressure and in normal relaxed state. The clearance disappears as soon as the bellows is brought back to working condition. However, this amount of clearance must be distinguished from the much greater clearance that develops if the bellows is formed by blow molding into rings preinstalled in the mold. It is contemplated herein that the rings fit the crests of the corrugations more snugly than that obtained by blow molding the bellows directly into same.

While two examples have been specifically described herein for construction of the crest-reinforcing rings, it should be evident that the rings may be constructed in various different ways. They may be cast in halves, either identical or not, they may be formed from sheet metal, and they may be fabricated in any other way which will occur to those skilled in the art. Instead of the illustrated T-bolt and screw-together fastenings, any other suitable arrangement may be used.

Having described the presently preferred embodiments of the invention, it will be understood that numerous changes may be made without departing from the true scope of the invention.

What is claimed is:

1. A flexible pipe connection comprising an annularly corrugated tube of sintered fluorocarbon resin, a substantially nonexpandable ring disposed in each of the valleys of the corrugated tube unbonded thereto and a substantially nonexpandable channel-shaped ring surrounding each of the crests of said corrugated tube closely fitting the maximum outside diameter of the corresponding crest at least when the pipe connection is in its original unstrained condition, the channel in said channel-shaped ring being deep enough to prevent dislocation from the corresponding crest during flexure of the connection but being shallow enough so as to leave substantial space between the edges thereof and the adjacent ring in a valley.

2. A flexible connection according to claim 1, wherein said channel-shaped ring comprises means for adjusting its girth to compensate for such inequality as may exist in crest diameter of the individual corrugations of said corrugated tube.

3. A flexible connection according to claim 2, wherein said material is sintered polytetrafluoroethylene resin.

4. A flexible connection according to claim 2, wherein said channel-shaped ring comprises a plurality of U-shaped sheet metal channel members joined in continuous end-to-end abutting relationship to the inner surface of a band clamp to form an adjustable ring with a radially inwardly directed channel.

5. A flexible connection according to claim 1, wherein said channel-shaped ring comprises a pair of half rings, and mans uniting said half rings in situ to form a complete ring.

6. A flexible connection according to claim 1, wherein said channel-shaped ring has a channel configuration in which the sidewalls diverge radially inwardly providing initial clearance between said sidewalls and the adjacent flanks of the underlying corrugation when the pipe connection is in its original unstrained condition.

* * * * *

PO-1050
(5/69)

UNITED STATES PATENT OFFICE
CERTIFICATE OF CORRECTION

Patent No. 3,633,945          Dated January 11, 1972

Inventor(s) Irving D. Press, Henry E. Heigis

It is certified that error appears in the above-identified patent and that said Letters Patent are hereby corrected as shown below:

Column 1, line 67, "Tee" should read --The--.

Column 2, lines 25 and 26, "holding" should read --bolting--.

Column 3, line 4, after "thereto" there should be a comma -- , --.

Column 4, line 6, after "adjustable" there should be inserted --girth--.

Signed and sealed this 13th day of June 1972.

(SEAL)
Attest:

EDWARD M. FLETCHER, JR.      ROBERT GOTTSCHALK
Attesting Officer               Commissioner of Patents